Figure 1:
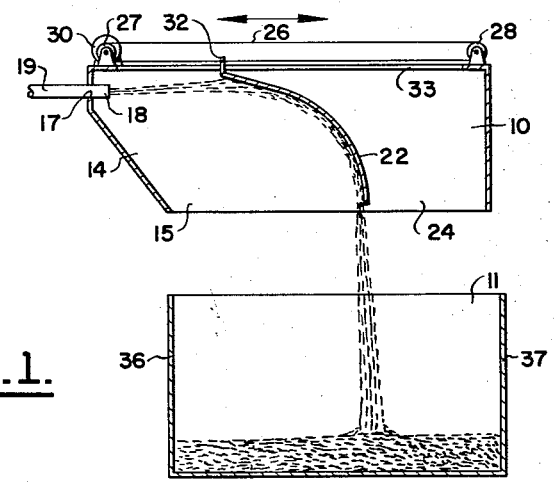

Nov. 27, 1956 W. SMITH 2,772,124
DISTRIBUTING APPARATUS FOR MATERIAL IN PARTICLE FORM
Filed Dec. 28, 1955 5 Sheets-Sheet 1

INVENTOR
WILLIAM SMITH
BY
Fetherstonhaugh & Co.
ATTORNEYS

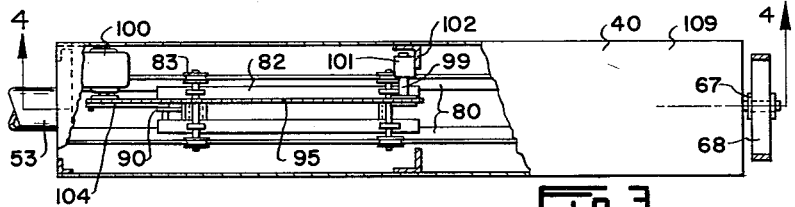
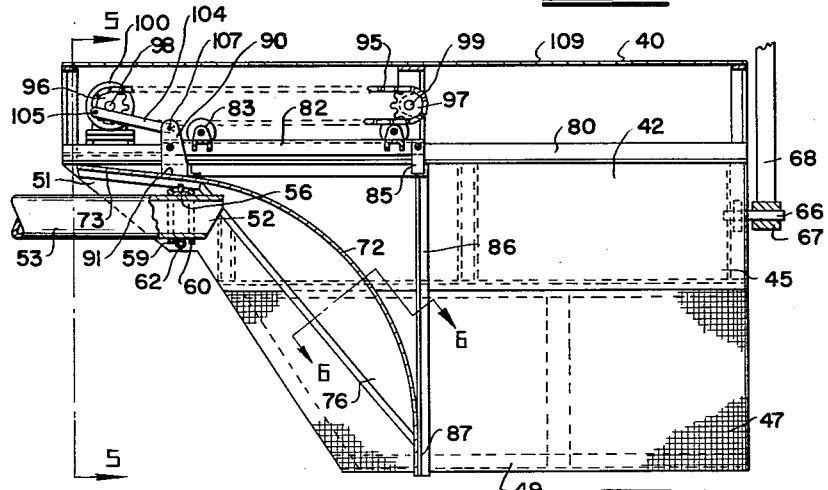
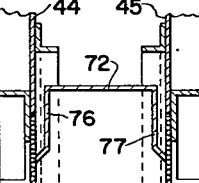
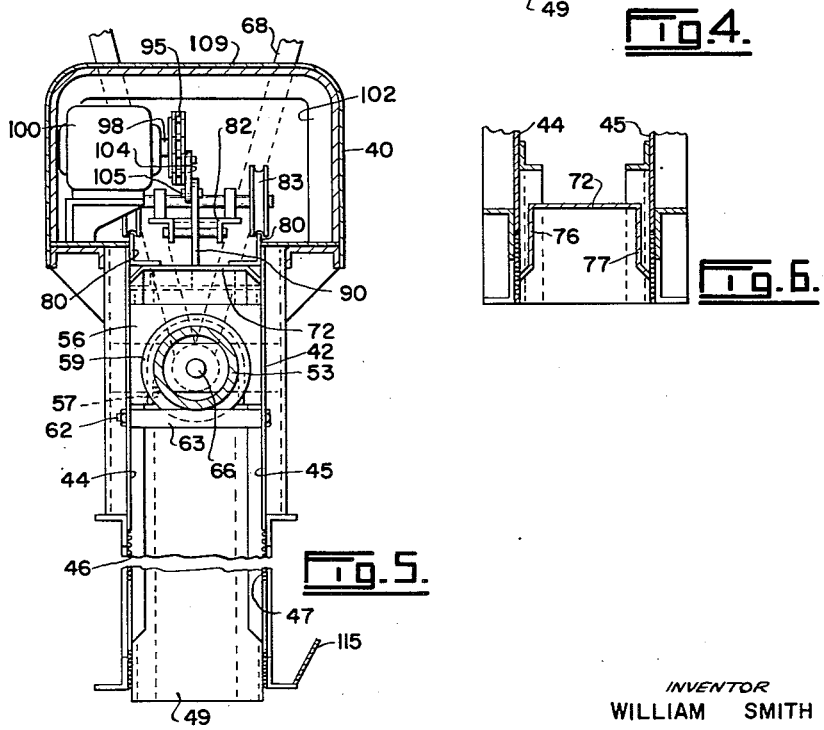

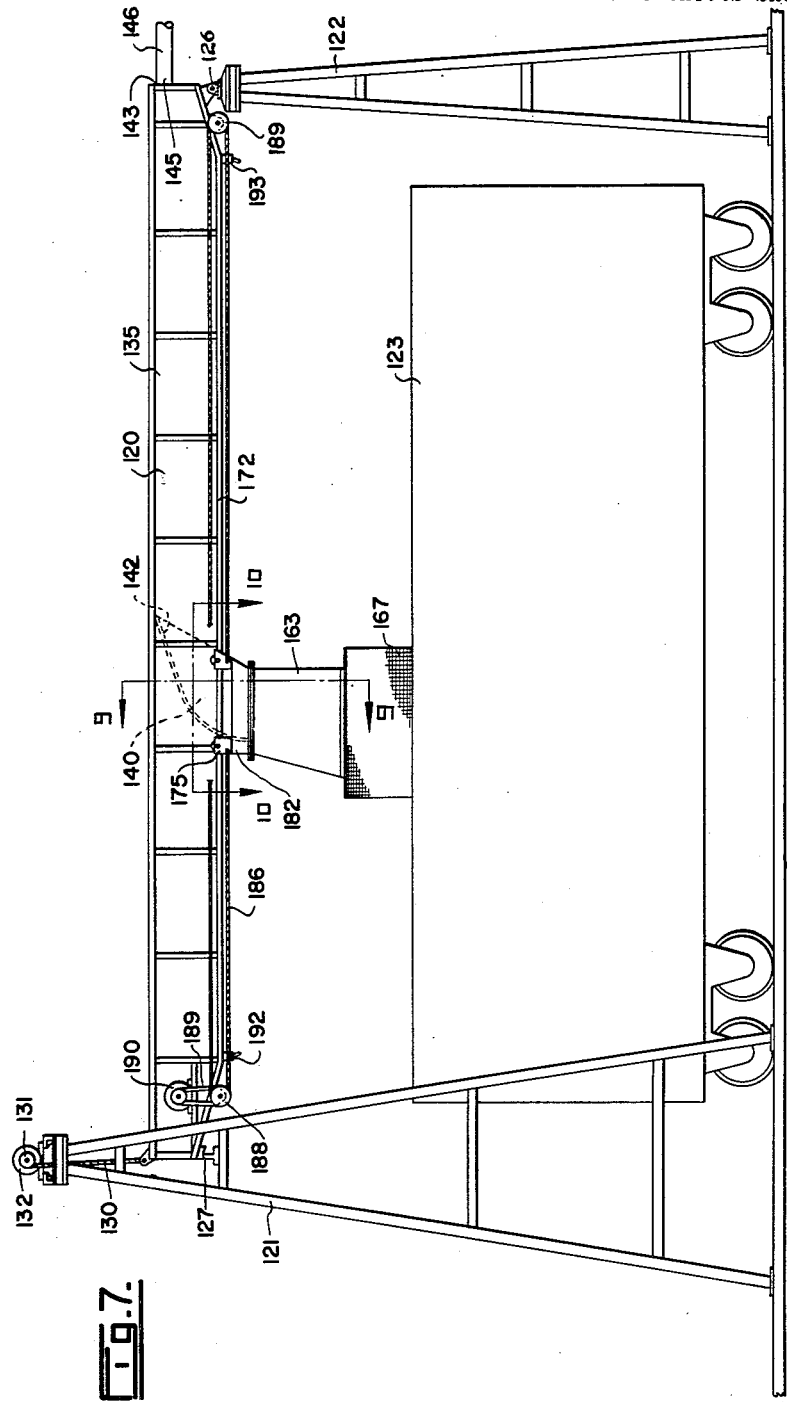

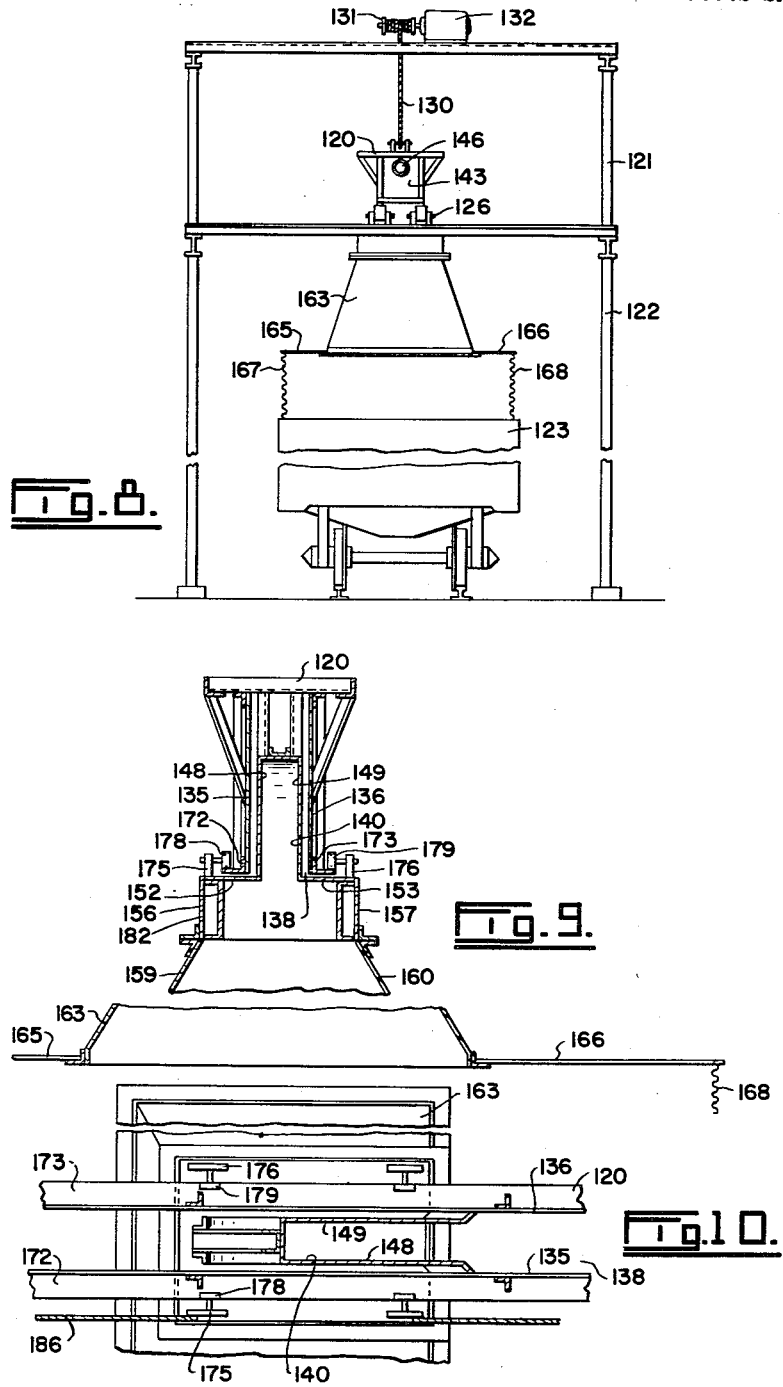

Nov. 27, 1956    W. SMITH    2,772,124
DISTRIBUTING APPARATUS FOR MATERIAL IN PARTICLE FORM
Filed Dec. 28, 1955    5 Sheets-Sheet 5
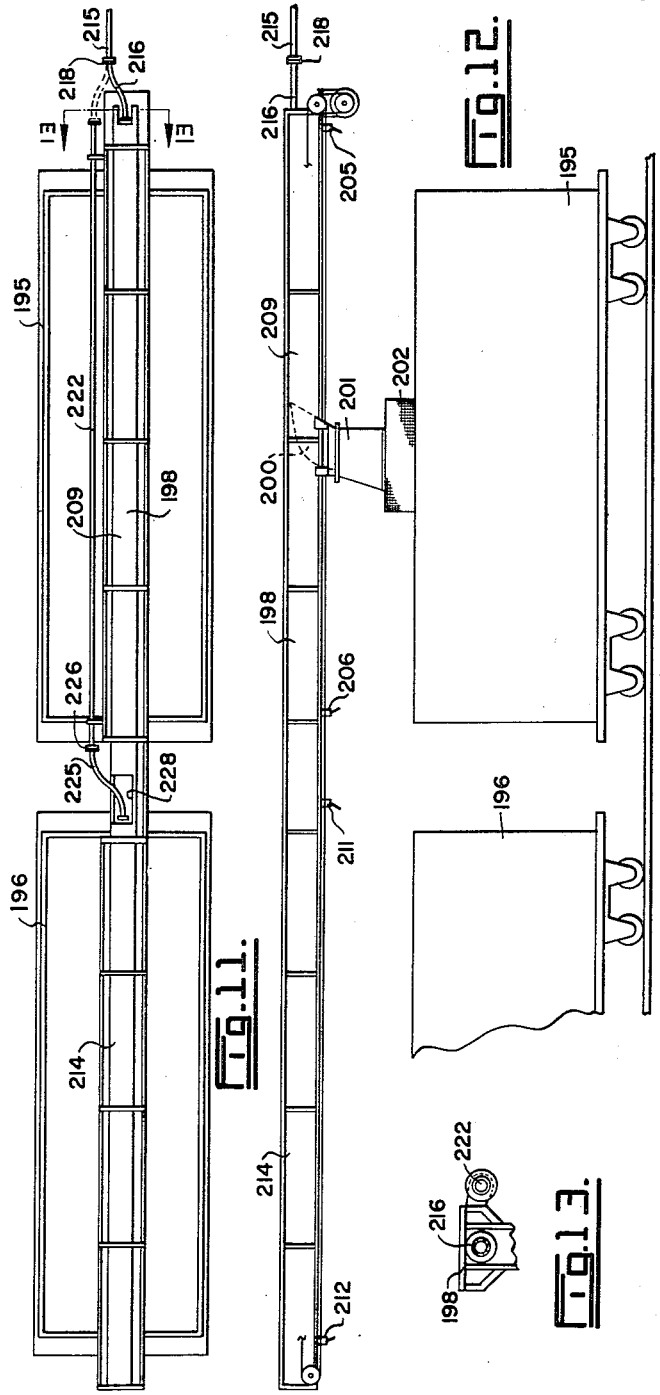
INVENTOR
WILLIAM SMITH
BY
Fetherstonhaugh & Co.
ATTORNEYS United States Patent Office 2,772,124
Patented Nov. 27, 1956

2,772,124

DISTRIBUTING APPARATUS FOR MATERIAL IN PARTICLE FORM

William Smith, Vancouver, British Columbia, Canada, assignor to Radar Pneumatics & Engineering Co. Ltd., Vancouver, British Columbia, Canada, a corporation of British Columbia Application December 28, 1955, Serial No. 555,965

12 Claims. (Cl. 302—61)

This invention relates to apparatus for distributing throughout a container material in particle form from the discharge of a pneumatic conveyor, and it may be used for wood chips, grain, sawdust, and powder and granular materials.

The main object of the present invention is the provision of apparatus which will evenly distribute and pack material in particle form throughout a container.

Another object is the provision of apparatus for deflecting particle material downwardly from the end of a pneumatic conveyor over a comparatively large area in a receiver.

For the sake of convenience, the apparatus will be described herein in connection with wood chips, but it is to be understood that it may be used with any material in particle form that may be moved by a pneumatic conveyor.

One of the main uses of this apparatus is to direct particle material into railroad cars. The apparatus directs the material into the cars in such a way that it is evenly spread throughout the horizontal sectional area thereof, and is evenly packed throughout the car. By loading the car evenly, the material is not allowed to build up to a peak at any point therein, thereby preventing any cascading, tumbling, or collapsing action of the material which would destroy the packing thereof resulting from the velocity at which the material is directed into the car or container. It has been found that by this even distribution and packing, a car can carry in the neighborhood of 25% more of a given material than it could carry by ordinary methods of directing material thereinto.

This apparatus includes a reciprocating deflector, and it may be arranged above a car to reciprocate transversely thereof. In this case, the car has to be moved back and forth beneath the deflector by suitable means, such as a mechanical car haul. Alternatively, the deflector may be reciprocated longitudinally of the car, in which case, the latter does not have to be moved during the loading operation.

Apparatus according to the present invention for distributing throughout a container material in particle form from the discharge of a pneumatic conveyor comprises an elongated hood having a relatively long discharge opening along the bottom thereof and an entrance at one end near the top thereof into which the discharge end of a pneumatic conveyor pipe may extend, said pipe end extending in the same direction as the hood, a downwardly-curved deflector mounted in the hood for movement longitudinally thereof, the upper end of said deflector being aligned with the hood entrance and the deflector curving outwardly from said entrance, and means for reciprocating the deflector in the hood, said deflector as it reciprocates directing material blown from the conveyor pipe downwardly through the discharge opening along the length of the latter.

Figure 2:
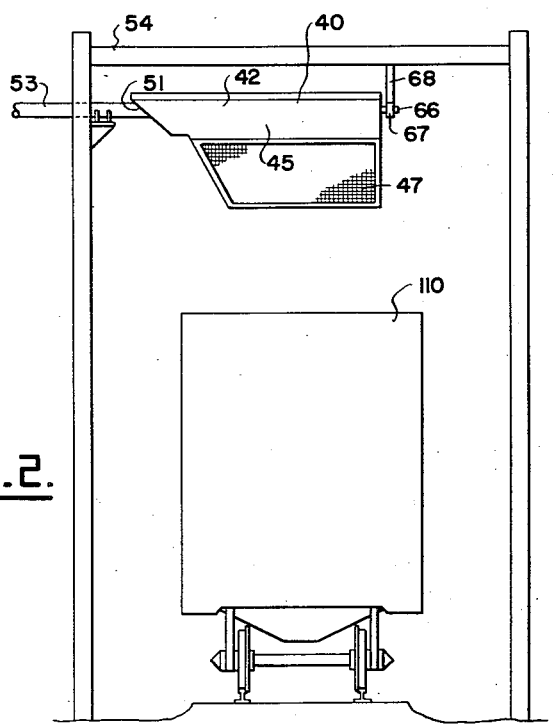

Examples of this invention are illustrated in the accompanying drawings, in which, Figure 1 is a diagrammatic sectional view through one form of the invention illustrating the general principle of the latter, Figure 2 is a side elevation of a practical form of apparatus shown mounted over a railroad car for transverse movement thereover, Figure 3 is an enlarged plan view of the distributing apparatus of Figure 2, Figure 4 is a vertical longitudinal section taken on the line 4—4 of Figure 3, Figure 5 is a vertical cross section taken on the line 5—5 of Figure 4, Figure 6 is a fragmentary section taken substantially on the line 6—6 of Figure 4, Figure 7 is a side elevation of another form of the invention mounted for longitudinal movement over a railroad car, Figure 8 is an end elevation of the apparatus of Figure 7, Figure 9 is an enlarged vertical cross section taken on the line 9—9 of Figure 7, Figure 10 is an enlarged horizontal section taken on the line 10—10 of Figure 7, Figure 11 is a diagrammatic plan view illustrating how the apparatus of Figure 7 may be used to direct particle material into two or more cars in line, Figure 12 is a diagrammatic side elevation of the apparatus of Figure 11, and Figure 13 is a diagrammatic section taken on the line 13—13 of Figure 11.

Figure 1 diagrammatically illustrates a simple form of apparatus similar to that of Figure 2, illustrating the basic idea of this invention. Distributing apparatus 10 is supported above a container 11. An elongated closed hood 14 has a relatively long discharge opening 15 along the bottom thereof. The hood has an entrance 17 at one end near the top thereof into which the discharge end 18 of a pneumatic conveyor pipe 19 extends. This end of the pipe extends generally in the same direction as the hood. A downwardly-curved deflector 22 is mounted within the hood for movement longitudinally thereof. This deflector slidably fits between the side walls 24 of the hood and extends in a curve from substantially the top of the hood to the bottom thereof. The upper end 26 of the deflector is aligned with the hood entrance 17. This deflector is reciprocated in the hood in any desired manner. For this purpose, an endless belt 26 extending around pulleys 27 and 28 is provided in Figure 1, one of said pulleys being driven in any convenient manner, such as by means of an electric motor 30. A lug 32 is connected to the upper end of deflector 22 and extends upwardly through an elongated slot 33 in the top of the hood and is connected to belt 26. Motor 30 may be a reversing motor and limit switches, not shown, may be provided at the opposite ends of the path of travel of the deflector lug 32 in order to reverse the motion of the deflector.

The travel of deflector 22 is such that its lower end moves substantially from one wall 36 to the opposite wall 37 of the container, said movement being above these walls. Material in particle form, such as wood chips, is directed at high velocity from the discharge end 18 of the pneumatic conveyor pipe 19 against the upper end of the deflector regardless of where the latter is relative to said discharge end. The deflector, in turn, directs the chips downwardly into the container 11. As the deflector is reciprocating in the hood 10, the chips are directed downwardly with considerable force throughout the entire distance between container walls 36 and 37. Therefore, the chips are spread evenly and packed from one side to the other of the container.

Figures 2 to 6 of the drawings illustrate a practical form of this distributing apparatus for directing particle material into a container or car transversely thereof. With the illustrated form of apparatus, it is necessary to move the car so that the materials are distributed and packed longitudinally thereof. Mechanical apparatus for moving cars in this manner is well known and does not need any description herein.

The distributing apparatus of Figures 2 to 6 is generally designated by the numeral 40 and includes an elongated hood 42 which is comparatively narrow and has spaced vertical side walls 44 and 45. The lower sections 46 and 47 of these walls are preferably formed of screen material, as shown, but the walls may be solid from top to bottom thereof, if desired. A relatively long discharge opening 49 is provided along the bottom of the hood between the side walls thereof. The hood also has an entrance 51 at one end thereof near its top, see Figure 4. The discharge end 52 of a pneumatic conveyor pipe 53 extends into this opening. In this particular form of the invention, one end of the hood is rotatably mounted on this pipe, said pipe being supported by a supporting frame 54, see Figure 2. As it is desirable to rotate the hood around the pipe, the mounting of the former on the latter may be accomplished by means of a bearing plate 56 which extends between and is secured to the hood walls 44 and 45, and has an opening 57 extending upwardly from its lower edge, said opening being just wide enough to accommodate the pipe. Spaced flanges 59 and 60 are fixed to the pipe on opposite sides of the bearing plate. A bolt 62 extends through the hood walls beneath the pipe and has a spacer 63 thereon. This bolt and its spacer are directly beneath bearing plate 56 and support the pneumatic conveyor pipe, as clearly shown in Figures 4 and 5.

The opposite end of the hood has a pin 66 projecting outwardly therefrom which fits in a bearing 67 carried by arms 68 depending from the top of the supporting frame 54, see Figure 2. The axis of pin 66 is in line with that of pipe 53 so that the hood 42 may be swung around said common axis.

A downwardly-curved deflector 72 is mounted in the hood for movement longitudinally thereof. The upper end 73 of this deflector is aligned with the hood entrance 51 and the discharge conveyor pipe 53, and said deflector curves outwardly and downwardly from said entrance. The deflector preferably extends downwardly at least to the bottom of the hood, and it may project through the discharge opening 49 thereof. If desired, the deflector 72 may be provided with side walls 76 and 77 which are parallel with the hood side walls 44 and 45.

A pair of tracks 80 are mounted on the top of hood 42 and extend longitudinally thereof. A carriage 82 is provided with wheels 83 riding on tracks 80. A finger 85 extends downwardly from one end of the carriage into the hood and is connected to a support 86 which, in turn, extends downwardly and is connected to the lower end of deflector 72 at 87. Another finger 90 is connected to the opposite end of the carriage and extends downwardly and is connected to the upper end of the deflector at 91. From this it will be seen that the deflector is suspended from the carriage 82 and moves therewith.

Carriage 82 of the deflector is reciprocated in any desired manner. In this example, an endless chain 95 extends around sprockets 96 and 97 mounted on shafts 98 and 99, shaft 98 being the power shaft of a motor 100. Shaft 99 is journalled in a bearing 101 carried by a support 102 extending upwardly from the top of hood 42. With this arrangement, motor 100 moves chain 95 around the sprockets. A link 104 is pivotally connected at one end at 105 to the side of chain 95, and it is pivotally connected at 107 at its opposite end to the upper end of finger 90 which projects above carriage 82. The distance between shafts 98 and 99 is such that when chain 95 moves around its sprockets, the deflector 27 is moved back and forth substantially the full distance between the opposite ends of the hood. A cover 109 is provided over the carriage and associated elements on top of the hood.

By referring to Figure 2, it will be seen that hood 42 is carried by the supporting frame 54 at a point spaced above a railroad car 110 which extends through said supporting frame. The length of hood 42 is equal to or a little less than the width of the car.

During operation of the distributing apparatus, particle material, such as wood chips, is directed at high velocity through the discharge end 52 of pneumatic conveyor pipe 53 against the upper end of deflector 72. This deflector directs the chips downwardly into the car 110. As the hood extends transversely of the car and the deflector is reciprocating within the hood, the chips are directed downwardly with considerable force across the full width of the car. With this particular form of the invention, it is necessary to move the car back and forth throughout its length beneath the hood. The combined movement of the deflector and the car ensures the chips being spread and packed throughout the entire area of the car. This spreading and packing results in considerably more chips being stored in the car than has hitherto been possible with the known types of loading equipment. This results in the utilization of a larger percentage of the carrying capacity of the car than has hitherto been possible.

As it is usually necessary to have a certain clearance over railroad tracks, hood 42 has been swingably mounted on supporting frame 54. When the apparatus is not in use, the hood may be swung upwardly into a horizontal position in any convenient manner. For example, a rope 115 may be connected to the bottom of the hood, see Figure 5, said rope extending upwardly over a pulley, not shown, carried by the frame 54.

Figures 7 to 10 illustrate an alternative form of the invention particularly designed for apparatus for distributing particle material throughout the length of a container or railroad car. In this example, the hood is made longer than that of the form of the invention illustrated in Figure 2.

A comparatively long hood 120 is supported at its opposite ends by towers 121 and 122, each of said towers spanning the track on which a railroad car 123 is positioned.

For the sake of convenience, one end of hood 120 may be pivotally mounted at 126 on tower 122, while the opposite end of said hood may rest on a support 127 carried by tower 121 when the apparatus is in operation. This end of the hood may be raised in any convenient manner, such as by means of a cable 130 connected to and extending upwardly over a drum 131 which is rotated by a reversible electric motor 132 mounted on top of tower 121.

Hood 120 has spaced side walls 135 and 136, said hood being narrow compared to its length, and it is provided with a long discharge opening 138 at the bottom thereof. A deflector 140 is mounted within the hood for reciprocal movement, the same as the previously-described deflector. The upper end 142 of this deflector is in line with an entrance 143 at one end of the hood near the top thereof into which the discharge end 145 of a pipe 146 of a pneumatic conveyor extends, said end extending generally in the same direction as the hood. The deflector curves outwardly and downwardly from the hood entrance and has side walls 148 and 149 extending substantially parallel with the side walls of the hood. In this example, the deflector extends downwardly through and beyond the discharge opening 138 of the hood.

The side walls 148 and 149 of deflector 140 extends downwardly a little below the bottom of hood 120 and have lateral extensions 152 and 153, respectively, projecting outwardly therefrom beyond the hood side wall. Skirts 156 and 157 extend downwardly from the outer edges of these extensions, and said skirts diverge laterally as at 159 and 160. In other words, the deflector extends downwardly part way into a comparatively large nozzle 163 which diverges laterally in a downward direction. By referring to Figure 8, it will be seen that the divergence of this nozzle is transversely of car 123. The lower end of the nozzle may be substantially the full width of the car, but it is preferable, as shown, to make the nozzle a little narrower than the car. In this case, supports 165 and 166 extend laterally from skirts 159 and 160, and have chain skirts 167 and 168 hanging downwardly therefrom. These chain skirts hang down just inside the side walls of the car. If desired, the chain skirts may extend completely around the bottom of the nozzle.

Deflector 140 and nozzle 163 depending therefrom may be reciprocated longitudinally of hood 120 in any desired manner. In this example, tracks 172 and 173 extend along the lower edges of the hood side walls 135 and 136 throughout the length thereof. Lugs 175 and 176 project upwardly from the outer edges of extensions 152 and 153 above these tracks, and wheels or rollers 178 and 179 carried by these lugs ride on the tracks. Therefore, the wheels 178 and 179 carry the deflector and the other elements associated therewith. Actually, the extensions 152—153 and skirts 156—157 form a carriage 182 supported by the wheels and upon which the deflector and the nozzle are mounted.

A cable 186 has its ends connected to the opposite ends of carriage 182, said cable extending around pulleys 188 and 189 mounted on hood 120 adjacent the ends thereof and in line with track 172 or 173. Pulley 188 is rotated through a belt drive 189 by a reversible electric motor 190 mounted on the hood at one side thereof. Limit switches 192 and 193 are mounted on the hood at the opposite ends of discharge opening 138 in line with the deflector carriage 182. These switches are electrically connected to the motor.

When the apparatus of Figures 7 to 10 is in operation, particle material, such as wood chips, is directed at high velocity by pipe 146 longitudinal of hood 120. The force behind the chips is sufficient to blow them the whole length of the hood. These chips strike the upper end of deflector 140 and are turned downwardly under considerable force and directed by nozzle 163 and the chain skirts depending therefrom into car 123. The nozzle directs the chips the full width of the car, and the chain skirts prevent them from being blown over the car sides. As the deflector is moving back and forth longitudinally through the hood at this time, the chips are spread and packed evenly throughout the length and width of the car. When carriage 182 strikes one of the limit switches 192 or 193, motor 190 is reversed to cause the deflector to be moved in the opposite direction.

When the apparatus is not in operation, one end of hood 120 may be raised by means of motor 132 to provide a desired amount of clearance over the railroad track.

Figures 11 to 13 diametrically illustrate a set-up which enables particle material to be distributed throughout two or more cars standing end to end, two cars 195 and 196 being illustrated by way of example. The apparatus used is very similar to that of Figures 7 to 10, the main difference being that the hood 198 is made long enough to extend over the number of cars to be filled which, in this case, is two. A deflector 200 is mounted within hood 198 and is reciprocated therein in the same manner as deflector 140 in its hood. Deflector 200 includes a nozzle 201 and chain skirts 202 depending therefrom. Limit switches 205 and 206 are provided at the opposite ends of section 209 of hood 198 extending over car 192, while limit switches 211 and 212 are provided at the opposite ends of section 214 of the hood extending over car 196.

When car 192 is being filled, deflector 200 is reciprocated back and forth in hood section 209 over said car and between limit switches 205 and 206. When each of these switches is engaged, the motor for reciprocating the deflector is reversed to cause the deflector to change direction. Similarly, when car 196 is being filled, the deflector travels back and forth in hood section 214 between switches 211 and 212.

A pneumatic conveyor pipe 215 extends towards one end of hood 198. A curved valve pipe section 216 is connected at one end by a swivel coupling 218 to the end of pipe 215. This coupling is such that it permits the pipe section 216 to rotate around the axis of the conveyor pipe. The free end of pipe section 216 extends into the entrance of hood 198. When in this position, the particle material is being blown into the hood section 209 over car 192 so that the material may be distributed and packed throughout said car.

When it is desired to fill the other car, the end of pipe section 216 is withdrawn from the hood, and said section is swivelled until its free end is aligned with another conveyor pipe 222. The pipe section is coupled to the end of this pipe 222. Another curved valve pipe section 225 is connected to the opposite end of pipe 222 by a swivel coupling 226. The free end of section 225 extends into an opening 228 in a side wall of the hood over the space between the two railroad cars. This is actually the entrance to hood section 214 over car 196.

At this time, particle material from pipe 215 is blown through pipe section 216, conveyor pipe 222 and pipe section 225 into the hood. The deflector 200 now reciprocates between switches 211 and 212 over car 196 so that the material is spread and packed throughout said car.

Curved pipe sections such as section 216 or 225, and conveyor pipes similar to pipe 222 are provided for any number of aligned railroad cars to be filled, it being necessary to make hood 198 long enough to extend over all the cars.

What I claim as my invention is:

1. Apparatus for distributing throughout a container material in particle form from the discharge of a pneumatic conveyor, comprising an elongated hood having a relatively long discharge opening along the bottom thereof and an entrance at one end near the top thereof into which the discharge end of a pneumatic conveyor pipe may extend, said pipe end extending in the same direction as the hood, a downwardly curved deflector mounted in the hood for movement longitudinally thereof, the upper end of said deflector being aligned with the hood entrance and the deflector curving outwardly from said entrance, and means for reciprocating the deflector in the hood, said deflector as it reciprocates directing material blown from the conveyor pipe downwardly through the discharge opening along the length of the latter.

2. Apparatus for distributing throughout a container material in particle form from the discharge of a pneumatic conveyor, comprising an elongated hood having a relatively long discharge opening along the bottom thereof and an entrance at one end near the top thereof into which the discharge end of a pneumatic conveyor pipe may extend, said pipe end extending in the same direction as the hood, track means extending longitudinally of the hood and supported thereby, a downwardly-curved deflector mounted in the hood and having wheels riding on the track means, the upper end of said deflector being aligned with the hood entrance and the deflector curving outwardly from said entrance, and means for reciprocating the deflector in the hood, said deflector as it reciprocates directing material blown from the conveyor pipe downwardly through the discharge opening along the length of the latter.

3. Apparatus for distributing throughout a container material in particle form from the discharge of a pneumatic conveyor, comprising an elongated hood having a relatively long discharge opening along the bottom thereof and an entrance at one end near the top thereof into which the discharge end of a pneumatic conveyor pipe may extend, said pipe end extending in the same direction as the hood, track means on the top of the hood extending longitudinally thereof, said hood having a slot therein parallel with the track means, a carriage riding on the track means, a downwardly-curved deflector in the hood, supporting means extending from the carriage through the hood slot and connected to the deflector, the upper end of said deflector being aligned with the hood entrance and the deflector curving outwardly from said entrance, and means connected to the carriage for reciprocating the deflector in the hood, said deflector as it reciprocates directing material blown from the conveyor pipe downwardly through the discharge opening along the length of the latter.

4. Distributing apparatus as claimed in claim 3 in which the reciprocating means comprises an endless chain extending over spaced sprockets mounted on top of the hood, link means connected to a side of the chain and to the deflector, and means connected to one of the sprockets for rotating the latter.

5. Distributing apparatus as claimed in claim 3 in which one end of the hood is mounted on the conveyor pipe for rotation about its axis, and including a bearing at the opposite end of the hood connected thereto, the axis of said bearing coinciding with the pipe axis, whereby the hood may be rotated around the pipe and bearing.

6. Apparatus for distributing throughout a container material in particle form from the discharge of a pneumatic conveyor, comprising an elongated hood having a relatively long discharge opening along the bottom thereof and an entrance at one end near the top thereof into which the discharge end of a pneumatic conveyor pipe may extend, said pipe end extending in the same direction as the hood, a downwardly-curved deflector mounted in the hood for movement longitudinally thereof, the upper end of said deflector being aligned with the hood entrance and the deflector curving outwardly from said entrance, skirts connected to opposite sides of the deflector and extending downwardly below the hood bottom, said skirts diverging laterally in a downward direction, and means for reciprocating the deflector in the hood, said deflector as it reciprocates directing material blown from the conveyor pipe downwardly through the discharge opening along the length of the latter and between the skirts.

7. Distributing apparatus as claimed in claim 6 including supports extending laterally from the skirts, and chain skirts hanging down from said supports.

8. Apparatus for distributing throughout a container material in particle form from the discharge of a pneumatic conveyor, comprising an elongated hood having a relatively long discharge opening along the bottom thereof and an entrance at one end near the top thereof into which the discharge end of a pneumatic conveyor pipe may extend, said pipe end extending in the same direction as the hood, a deflector unit slidably mounted in the hood and projecting down through the discharge opening thereof, track means along the outer surface of each side of the hood at the bottom thereof, supporting means connected to the sides of the deflector unit and extending upwardly therefrom along the outer surfaces of the hood, roller means carried by the supporting means and riding on the track means to carry the deflector unit, said unit including a baffle curving outwardly and downwardly from a point aligned with the hood entrance, and means for reciprocating the deflector in the hood, said deflector as it reciprocates directing material blown from the conveyor pipe downwardly through the discharge opening along the length of the latter.

9. Distributing apparatus as claimed in claim 8 including skirts connected to opposite sides of the lower part of the deflector unit and extending downwardly therefrom, said skirts diverging laterally in a downward direction.

10. Distributing apparatus as claimed in claim 9 including supports extending outwardly laterally from each skirt, and chain skirts hanging down from said skirts spaced from the first-mentioned skirts.

11. Distributing apparatus as claimed in claim 8 in which the hood is pivotally mounted at one end, and including means connected to the opposite end of the hood by means of which the latter end may be raised and lowered.

12. Distributing apparatus as claimed in claim 8 in which the reciprocating means comprises a cable extending over pulleys mounted on the hood at opposite ends thereof, the ends of said cable being connected to the deflector unit, a reversible electric motor operatively connected to one of the pulleys to rotate the latter, and limit switches at opposite ends of the hood operated by the deflector unit as it approaches their respective hood ends to reverse the motor and cause the unit to move in the opposite direction.

No references cited.